(12) United States Patent
Downs et al.

(10) Patent No.: US 6,453,864 B1
(45) Date of Patent: Sep. 24, 2002

(54) CRANKSHAFT ROTATION CONTROL IN A HYBRID ELECTRIC VEHICLE

(75) Inventors: Robert Charles Downs, La Jolla, CA (US); Goro Tamai; Tony T. Hoang, both of Warren, MI (US); Dennis T. Richey, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 65 days.

(21) Appl. No.: 09/760,503

(22) Filed: Jan. 16, 2001

(51) Int. Cl.$^7$ ............................................. F02N 17/08
(52) U.S. Cl. ........................ 123/179.3; 123/179.28; 123/196 S; 180/65.2; 180/65.3; 180/65.4
(58) Field of Search ................... 180/65.2, 65.3, 180/65.4; 123/179.3, 179.28, 196 S

(56) References Cited

U.S. PATENT DOCUMENTS

| | | | | |
|---|---|---|---|---|
| 4,180,138 A | * | 12/1979 | Shea | 180/243 |
| 4,699,097 A | * | 10/1987 | Tanaka et al. | 123/179.25 |
| 4,875,551 A | * | 10/1989 | Lulich | 123/179.1 |
| 5,692,464 A | * | 12/1997 | Kimura | 123/305 |
| 5,699,764 A | * | 12/1997 | Allen et al. | 123/179.5 |
| 5,924,395 A | * | 7/1999 | Moriya et al. | 123/179.18 |
| 6,032,632 A | * | 3/2000 | Bolenz et al. | 123/179.28 |
| 2001/0022245 A1 | * | 9/2001 | Rogg | 180/65.3 |

* cited by examiner

Primary Examiner—Erick Solis
(74) Attorney, Agent, or Firm—Leslie C. Hodges

(57) ABSTRACT

A method of controlling engine crankshaft motion in a hybrid electric drive system having an internal combustion engine and a motor-generator operatively connected to a crankshaft of the engine is disclosed. The steps include monitoring the crankshaft position, forecasting a crankshaft stall position; comparing the forecast stall position with a target range; and if the forecast crankshaft stall position is outside the target range, operating the motor-generator to modify the forecast stall position to be within the target range. These steps properly position the crankshaft for re-initiating engine start-up. The method further includes the steps of calculating an effective lube interval time once the crankshaft speed is zero; comparing the effective lube interval time to a critical time; and if the effective lube interval time is greater than the critical time, pulsing the motor-generator to rock the crankshaft for a pulse time to redistribute a lubricant film.

11 Claims, 3 Drawing Sheets

CRANKSHAFT ROTATION CONTROL IN A HYBRID ELECTRIC VEHICLE

TECHNICAL FIELD

The present invention relates to a control system for inducing crankshaft rotation and imposing crankshaft position in a hybrid electric vehicle.

BACKGROUND OF THE INVENTION

A hybrid electric vehicle may be powered alternatively or simultaneously by an internal combustion engine and an electric motor to maximize fuel economy. The electric motor may be part of an electric machine, referred to herein as a motor-generator, which may replace the conventional starter motor and alternator. To move the vehicle from a stopped position, the motor-generator draws electrical energy from a battery pack to turn the engine crankshaft. As vehicle speed increases, fuel and spark are delivered to initiate engine operation. At a certain vehicle speed range, the motor-generator may operate as a generator driven by the engine crankshaft to recharge the battery pack and to supply electrical power to auxiliary vehicle devices such as fans, radios, etc.

When the vehicle is coasting or braking, fuel flow to the engine may be stopped to improve fuel economy. During fuel-off deceleration downshifts, the motor-generator may operate as a motor to synchronize engine and transmission speeds by increasing engine speed to facilitate a downshift. When the engine is off, the auxiliary vehicle devices are powered by the battery pack in cooperation with a DC-DC converter.

If the vehicle is stalled for a period of time, the engine oil pressure gradually decreases in the oil feed galleys to the crankshaft and connecting rod bearings, which may lead to a degradation of the lubricant film and a pure boundary lubrication condition. Due to such an increased friction condition, re-initiating engine start up may require higher torque input from the electric motor-generator to crank the crankshaft.

Another mechanism that can affect the torque required to re-initiate engine start up is the crankshaft angular location during an engine stall. It is favorable to have the crankshaft rest with the intake valve open at the cylinder which is in its intake stroke. If the intake valve closes, the relatively cool inducted air is expanded by the hot cylinder walls, raising the cylinder pressure, hence increasing the required torque to rotate the crankshaft.

As the engine is cranked, the driver may feel compression vibration from the engine. The smoothness of the engine cranking is a function of the rotational position of the crankshaft upon engine start up since the torque required to rotate the crankshaft undulates with the in-cylinder pressures.

SUMMARY OF THE INVENTION

The present invention provides a control method for inducing crankshaft rotation in a hybrid electric vehicle. The control method provides the capability of operating an electric motor-generator to affect at what rotational orientation the crankshaft will stop, as the crankshaft speed slows to zero. Further the control method operates the motor-generator to rotate the crankshaft forward or backwards to a more advantageous rotational location once the crankshaft speed is zero, prior to restarting the engine, to minimize the vibration felt by the driver. The control method determines the crankshaft rotational location using a crankshaft locational sensing means which may operate in conjunction with the ignition system.

The control method also provides the capability of powering the electric motor-generator to rotate the crankshaft in one or both rotational directions to redistribute the lubricant film on the crankshaft bearings. This minimizes the need for greater motor torque input to restart the engine as the friction level is maintained and not appreciably increased. The control method measures the time the engine is stalled as a function of the engine coolant temperature and oil pressure to determine when power pulsations to the electric motor are required to "rock" the crankshaft to re-establish the lubricant film.

DESCRIPTION OF THE PREFERRED EMBODIMENT

Figure 1:
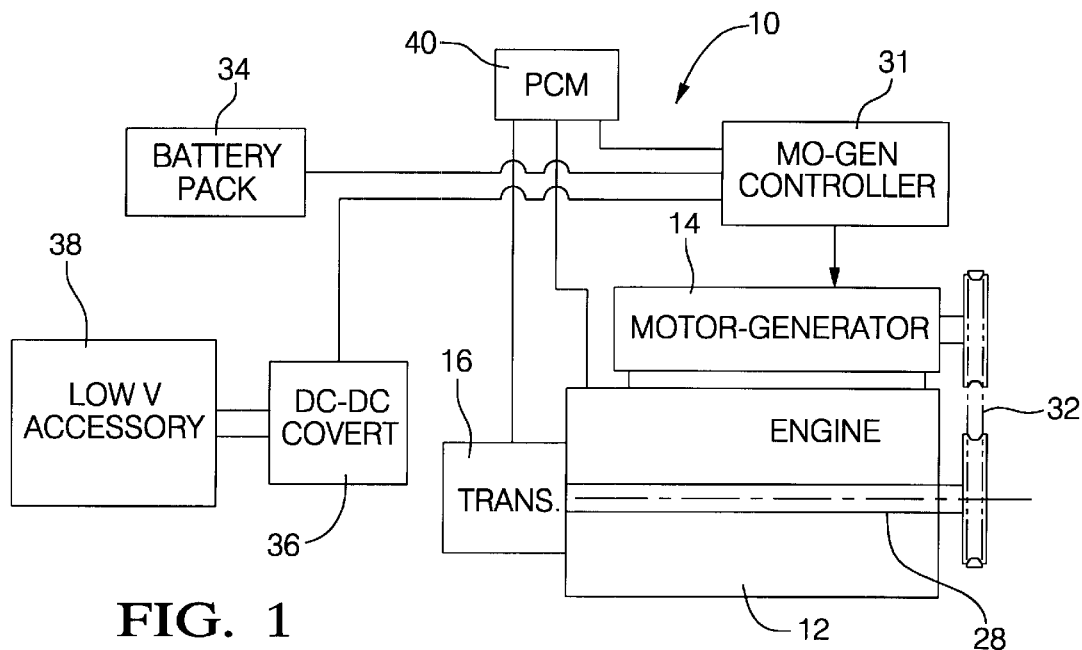
FIG. 1 is a schematic illustration of a hybrid vehicle drive system.

With reference to FIG. 1, a hybrid electric vehicle includes a hybrid drive system, shown generally as 10, having an internal combustion engine 12, an electric machine referred to herein as a motor-generator 14, and a multi-speed automatic transmission 16.

Figure 2:
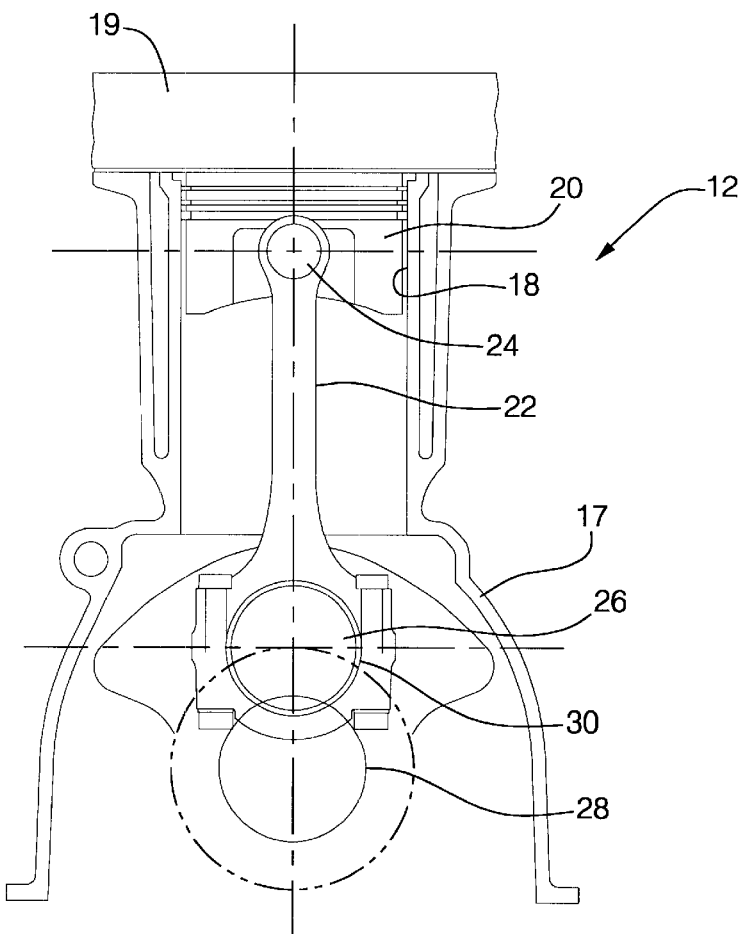
FIG. 2 is a cross sectional view of the internal combustion engine of the hybrid vehicle drive system.

The internal combustion engine 12 may be of conventional construction as shown in FIG. 2, comprising an engine block 17 having one or more cylinders 18 and a cylinder head 19 mating with the upper face of the engine block to close off the cylinders. A piston 20 is housed in each cylinder 18 for reciprocation therein and is connected to an upper end of a connecting rod 22 by a piston pin 24. The lower end of the connecting rod 22 is connected to a throw 26 of a crankshaft 28 by a connecting rod bearing assembly 30. The crankshaft 28 is rotatably supported by upper main bearing supports in the lower face of the engine block and by lower main bearing caps bolted to the engine block. An oil pan, not shown, mounts to the lower face of the engine block and provides an oil reservoir. An oil pump, not shown, circulates oil from the oil pan through oil feed galleys in the engine and in particular to lubricate the interface of the crankshaft 28 to its main bearing supports and the connecting rod bearing assembly 30.

The electric motor-generator 14 of the hybrid drive system 10 in FIG. 1 is an electric machine having a stator and a rotor, both not shown, selectively controlled by controller 31. The controller 31 is a conventional digital programmable computer with power electronics. The rotor of the motor-generator is directly connected to the crankshaft 28 of the engine 12 such as via a direct drive mechanism 32 shown as a belt and pulley in FIG. 1, connected to the front end of the engine. This allows the motor-generator 14 to selectively operate as a starter motor in supplying a cranking torque to the crankshaft 28 and to operate as a generator by receiving rotational energy from the crankshaft and converting it to electrical energy for recharging an associated battery pack 34. The motor-generator may also be arranged between the engine and transmission where the stator is mounted to the rear of the engine block or to the transmission housing and the rotor is connected to the crankshaft through a clutch assembly or hub.

A DCDC converter 36 is provided to direct higher voltage charging power from the motor-generator controller 31 to a lower voltage vehicle accessory system 38 for powering accessories such as radios and fans during generator operation.

The transmission 16 of the vehicle drive system is a well-known device including gear sets and friction devices operable to provide a number of drive speed ratios between the engine and vehicle drive wheels. It may further include a torque converter if desired. A powertrain control module (PCM) 40 controls the operation of the engine 12, transmission 16, and motor-generator controller 31.

A general control and operating sequence for the hybrid drive system is described next. Initial vehicle key-up is analogous to that of a conventionally powered vehicle. The driver turns the ignition key to the crank state, wherein the controller 31 signals the motor-generator 14 to draw electrical energy from the battery pack 34. The motor-generator 14 transfers torque to the engine crankshaft 28 via the belt drive 32 to crank the engine 12.

Above a certain engine speed while the engine 12 is operating, the motor-generator 14 may operate as a generator due to the rotational input from the crankshaft 28 to recharge the battery pack 34 and power the vehicle accessory system 38.

When the driver applies the brake pedal or does not apply the gas pedal during an extended coast, fuel delivery may stop to conserve fuel and control emissions. To balance driver-felt smoothness and fuel economy, the fuel may be cut off one cylinder at a time as the spark is ramped down. During fuel-off vehicle coasting, the controller 31 may reverse the motor-generator's polarity to direct charging current to the battery pack 34 and decelerate the vehicle by slowing the engine speed. This motor-generator operation is referred to as "regenerative braking". When the engine speed drops below a certain speed where compression pulses may become objectionable to a driver, the PCM 40 shifts the transmission 16 to an effectively neutral gear thereby stalling the engine 12. This so called "drop-to-neutral" speed, in the range of 400 to 900 rpm, is chosen to be as low as possible to improve driveability and may vary based on vehicle deceleration.

Further, during fuel-off deceleration downshifts, the motor-generator 14 may operate as a motor to synchronize engine and transmission speeds as needed. Since an engine idle-air-control motor, which is conventionally used to match engine and transmission speeds, has no effect during fuel-off mode, the motor-generator 14 increases the engine speed for seamlessly releasing the higher gear clutch and engaging the lower gear clutch. Downshifts ensure the transmission 16 is in the proper gear for re-acceleration. If the driver demands acceleration after the engine speed has dropped below a minimum reference, the motor-generator 14 may again act as a motor to turn the crankshaft 28, in conjunction with fuel delivery, to restart combustion in the spinning engine.

To begin vehicle movement from a vehicle stop, such as at a traffic light, upon releasing the brake pedal, the controller 31 signals the motor-generator 14 to draw electrical energy from the battery pack 34. As the motor-generator 14 cranks the crankshaft 28, the vehicle moves forward due to electrical creep drive via the torque converter or starting clutch, at which time fuel and spark are delivered to initiate engine combustion. The motor-generator 14 may supplement the torque needed for acceleration supplied by the engine, especially at lower start-up speeds.

The smoothness of engine cranking based on compression vibration felt by a driver during vehicle launch from a fuel-off stop has been shown to be a function of the initial crankshaft rotational orientation. The torque required to rotate the crankshaft fluctuates with in-cylinder pressures. Therefore the present invention is a method of controlling engine crankshaft motion to affect the crankshaft stall position. The method provides two opportunities to modify the crankshaft stall orientation—once during deceleration, referred to as the Pre-Positioning Control Cycle, and once the engine has stopped, referred to as the Stall Positioning Control Cycle.

To support the Positioning cycles, a means for sensing the crankshaft rotational orientation is provided. One such locational sensing means is embodied in a six-tooth encoder wheel about the crankshaft where a seventh tooth is cut into the crankshaft to indicate top-dead-center, for example, for two of four cylinders. A magnetic pickup senses the teeth of the encoder and this information in conjunction with software monitoring the ignition cycle can resolve where, in the four-stroke cycle, the engine has stalled. A second locational sensing means is an optical encoder requiring an optical sensor to detect the rotational orientation of the crankshaft.

The actual desired position of the crankshaft for restart is based on the specific engine application. For example, the desired position of the crankshaft in a four cylinder engine may be with a pair of the pistons within sixty crank degrees before or after top-dead-center, before the intake valve close position for the cylinder in its intake stroke. The tolerance for the desired position is dependent on how sensitive the resolution is for sensing the crankshaft position. For example, a crankshaft six-tooth encoder, where the teeth are located at sixty degree intervals about the crankshaft, can only resolve the position within a sixty degree window. Properly positioning the crankshaft may be less critical in engines with more than four cylinders.

The Pre-Positioning Control method operates to affect the stalled crankshaft position once the vehicle is decelerating in the fuel-off mode and the crankshaft speed falls below the "drop to neutral" speed. An engine stall is commanded (by shifting the transmission to an effectively neutral gear) and the motor-generator is commanded to ramp in some regenerative braking to quickly decrease the engine speed. This assists in preventing "stumbling run-on" of combustion.

Figure 3A:
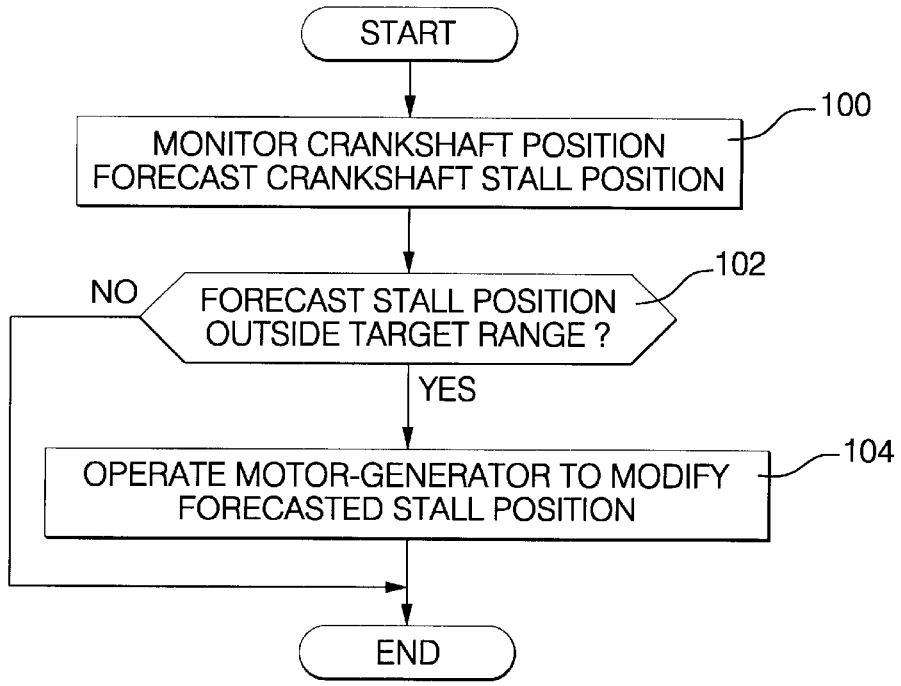
FIG. 3 is a flow chart of the control method of the present invention operational in the drive system of FIG. 1.

As shown in FIG. 3A, the Pre-Positioning control method includes monitoring the crankshaft position via the locational sensing means. With this data and the deceleration rate of the crankshaft, the controller forecasts the crankshaft stall position in block 100. If the forecasted position is within the target range, then the pre-positioning control method is complete. If the forecasted position is outside the target range in block 102, then the controller operates the motor-generator to affect the forecasted stall position in block 104. This may be accomplished by either applying a preloading torque in the direction of the crankshaft rotation to keep the crankshaft from rocking back once it stops or applying regenerative braking to slow the crankshaft to the desired position. The motor-generator pre-positioning control is performed to stall the engine so that the crankshaft position falls as close to, if not within, the target range.

Figure 3B:
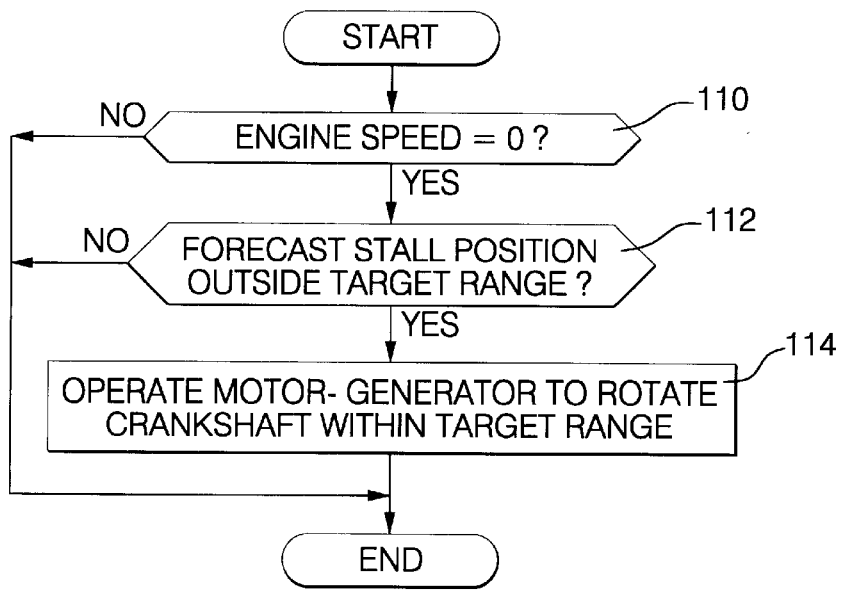

The Stall Positioning control method may be initiated after the Pre-Positioning control has been run or it may be executed independently. In either case, the Stall Positioning control method begins when the engine speed is zero in FIG. 3B block 110. Like the Pre-Positioning method, the controller compares the forecasted stall position to the target range in block 112. An actual crankshaft position is not obtainable when the crankshaft is not rotating. If the forecasted crankshaft position falls outside the target position range, the controller signals the motor-generator to draw current from the battery pack, and rotate the crankshaft to a position within the reference position range in block 114. If the crankshaft position falls within the reference position range, then it is properly prepared for minimizing compression vibration upon vehicle launch from the engine-off state.

Figure 3C:
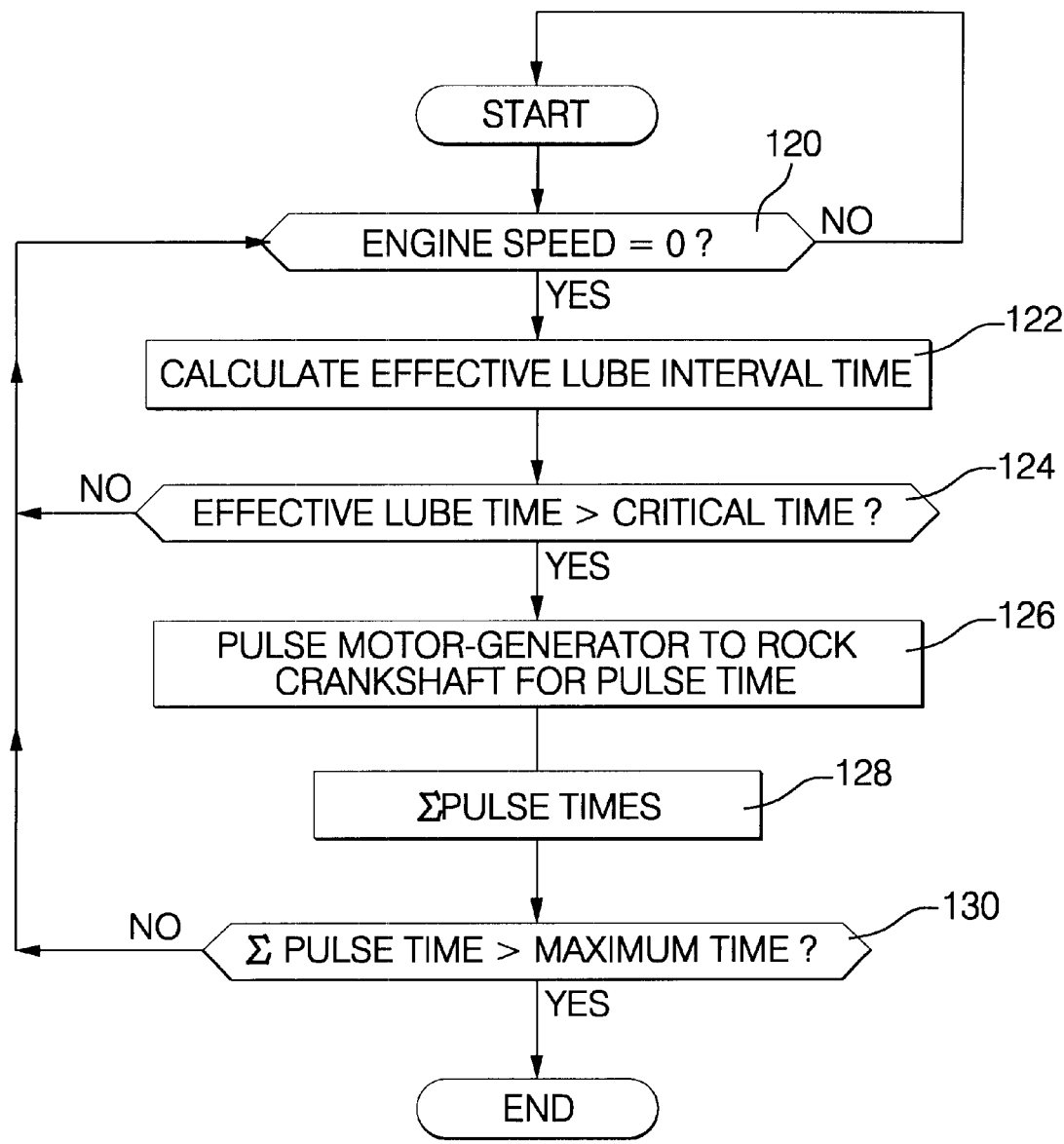

The method of controlling engine crankshaft motion further includes a Lubrication Redistribution control, which may be initiated when the engine is stalled in FIG. 3C block 120 and after the Stall Positioning control cycle. Under certain drive conditions, the engine may remain stalled for an extended period of time. Concurrently, the engine oil pump is also inoperative. Oil pressure gradually drops in the oil feed galleys throughout the engine, and in particular to the galleys feeding the connecting rod bearings. During extended stall times, the lubricant film between the crankshaft and the connecting rod and main bearings may degenerate leading to a pure boundary lubrication condition. Such a condition increases the torque needed to crank the engine to restart it. To maintain the lubricant film at the crankshaft-bearing interface, the control method of the present invention operates to power the motor-generator to gently rock, i.e. rotate, the crankshaft in one or both rotational directions.

To determine if the crankshaft needs to be lubricated in FIG. 3C block 122, the controller calculates an effective lube interval time. This variable takes into account not only how long the engine is stalled without active lubrication, but the controller also checks an engine coolant temperature sensor to monitor the engine coolant temperature, and an oil pressure sensor to monitor engine oil pressure. The controller then compares the effective lubrication interval to a critical time in block 124. For example, the critical time may be 10 to 20 seconds. If the effective lube interval is greater than the critical time, then the crankshaft needs to be rocked to redistribute the lubricant film on the bearings. In block 126, the controller signals the motor-generator to draw power from the battery pack and deliver pulses to rotate the crankshaft, referred to as rocking the crankshaft. The motor-generator may rotate the crankshaft in both directions or it may rotate in one direction with the crankshaft rocking back naturally due to compression reaction forces. To adequately redistribute the lubrication, the crankshaft need only be rotated approximately 10 to 60 degrees.

Preferably the crankshaft returns to its initial position following the lubrication redistribution cycle as the position may have already been set by the previous positioning cycle. To ensure that the crankshaft is returned to its initial position, a locating wheel on the motor-generator having a finer resolution than the crankshaft locating wheel may be used to monitor the location of the motor-generator and therefore the change in position of the crankshaft during the lubrication redistribution cycle.

The pulse times of the motor-generator are summed in block 128 and compared to a maximum reference time in block 130. If the summed pulse time is greater than the maximum time, then the lubrication cycle is terminated. This is a safety feature to prevent the risk of battery drain. For example, the maximum time may be 500 seconds, which would allow 50 motor-generator pulsations at 10 second intervals. Typically, the engine will be restarted before the maximum time is reached. If the summed pulse time is less than the maximum, then the controller continues to monitor the input variables and run the lubrication redistribution routine until the engine restart command is given.

The present invention is for controlling engine crankshaft motion through the use of the motor-generator operatively connected to the engine crankshaft. In particular, the method may be used for positioning the crankshaft for a smoother re-start of the engine and for re-creating a lubricant film on the crankshaft bearings when the engine has been stalled for a given period of time.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A method of controlling engine crankshaft motion in a hybrid electric drive system having an internal combustion engine and a motor-generator operatively connected to a crankshaft of the engine, comprising the steps of:

monitoring the crankshaft position;

forecasting a crankshaft stall position;

comparing the forecast stall position with a target range; and if the forecast crankshaft stall position is outside the target range, operating the motor-generator to modify the forecast stall position to be within the target range.

2. The method of claim 1, wherein the step of operating the motor-generator further includes one of the following steps:

applying a preloading torque to the crankshaft in the direction of crankshaft rotation; and applying regenerative braking to slow the crankshaft to stall within the target range.

3. The method of claim 2, further comprising the steps of:

after operating the motor-generator, monitoring the crankshaft speed;

if the crankshaft speed is zero, comparing the crankshaft stall position to the target range; and if the crankshaft stall position is outside the target range, operating the motor-generator to modify the crankshaft stall position to be within the target range.

4. The method of claim 3, further comprising the step of:

after the crankshaft speed is zero, calculating an effective lube interval time;

comparing the effective lube interval time to a critical time; and if the effective lube interval time is greater than the critical time, pulsing the motor-generator to rock the crankshaft for a pulse time to redistribute a lubricant film.

5. The method of claim 4, wherein the step of calculating the effective lube interval time further comprising the steps of:

monitoring engine coolant temperature;

monitoring engine oil pressure; and monitoring how long the crankshaft speed is zero without motor-generator pulsations.

6. The method of claim 5, further comprising the step of:

summing the pulse times.

7. The method of claim 6, further comprising the step of:

comparing the summed pulse time to a maximum time; and if the summed pulse time is greater than the maximum time, discontinuing further pulsing of the motor-generator.

8. A method of controlling engine crankshaft motion for lubrication redistribution in a hybrid electric drive system having an internal combustion engine and a motor-generator operatively connected to a crankshaft of the engine, comprising the steps of:

monitoring crankshaft speed;

if crankshaft speed is zero, calculating an effective lube interval time;

comparing the effective lube interval time to a critical time;

if the effective lube interval time is greater than the critical time, pulsing the motor-generator to rock the crankshaft for a pulse time to redistribute a lubricant film.

9. The method of claim 8, wherein the step of calculating the effective lube interval time further comprising the steps of:

monitoring engine coolant temperature;

monitoring engine oil pressure; and monitoring how long the crankshaft speed is zero without motor-generator pulsations.

10. The method of claim 9, further comprising the step of:

summing the pulse times.

11. The method of claim 10, further comprising the steps of:

comparing the summed pulse time to a maximum time; and if the summed pulse time is greater than the maximum time, discontinuing further pulsing of the motor-generator.

\* \* \* \* \*